United States Patent
Jhingran et al.

(10) Patent No.: US 9,875,272 B1
(45) Date of Patent: Jan. 23, 2018

(54) METHOD AND SYSTEM FOR DESIGNING A DATABASE SYSTEM FOR HIGH EVENT RATE, WHILE MAINTAINING PREDICTABLE QUERY PERFORMANCE

(71) Applicant: Google Inc., Mountain View, CA (US)

(72) Inventors: Anant Jhingran, San Jose, CA (US); Rupesh Kumar, Bangalore (IN); Sanjoy Bose, Bangalore (IN)

(73) Assignee: Google Inc., Mountain View, CA (US)

( * ) Notice: Subject to any disclaimer, the term of this patent is extended or adjusted under 35 U.S.C. 154(b) by 337 days.

(21) Appl. No.: 14/748,225

(22) Filed: Jun. 23, 2015

(51) Int. Cl.
G06F 17/00 (2006.01)
G06F 17/30 (2006.01)

(52) U.S. Cl.
CPC .. *G06F 17/30371* (2013.01); *G06F 17/30342* (2013.01); *G06F 17/30581* (2013.01); *G06F 17/30584* (2013.01)

(58) Field of Classification Search
CPC ............... G06F 17/30; G06F 17/30371; G06F 17/30445; G06F 17/30864; G06F 17/30342; G06F 17/30581
USPC ................................................. 707/600–899
See application file for complete search history.

(56) References Cited

U.S. PATENT DOCUMENTS

2002/0065919 A1* 5/2002 Taylor ............... G06F 17/30575
709/226

* cited by examiner

*Primary Examiner* — Isaac M Woo
(74) *Attorney, Agent, or Firm* — Fish & Richardson P.C.

(57) ABSTRACT

A computer-implemented database system, method, and computer program product are provided. the database system comprises a plurality of nodes, each node including a data storage device having memory and a server; and a database system controller coupled to each of the plurality of nodes and having a processor and software program code for directing the database system to perform the following function of defining, for a user, a node group including at least one of the plurality of nodes, upon which the user's data is to be stored in a user database; wherein the user database is defined in terms of time-partitioned tables residing on the nodes of the node group, and wherein each time-partitioned table is further defined in terms of shards of the user's data, the shards corresponding with respective ones of the time partitions. The user data is managed in terms of the shards on respective nodes of the node group, and the time-partitioned tables include a chronologically oldest time-partitioned table and a current time-partitioned table into which a new user data entry will be written. The system further performs the functions of determining whether a predetermined criterion has been met; and, responsive to the detecting that the predetermined criterion has been met, purging all shards of the chronologically oldest time-partitioned table.

25 Claims, 9 Drawing Sheets

Concept of Nodegroup

Each nodegroup is across a set of nodes and contains for now exactly one customer (maybe changed later).

Two TP's across two nodes (thus two shards each)

FIG. 9

*Fact data*

| time_stamp | login_name | client_ip | web_resource | http_code | msg_bytes |
|---|---|---|---|---|---|
| 07/Mar/2014:16:05:49 -0800 | John Doe | 64.242.88.10 | GET /twiki/bin/edit/Main/Double_bounce_sender?topicparent=Main.ConfigurationVariables HTTP/1.1 | 401 | 12846 |
| 07/Mar/2014:16:06:51 -0800 | Richard Roe | 68.242.38.10 | GET /twiki/bin/rdiff/TWiki/NewUserTemplate?rev1=1.3&rev2=1.2 HTTP/1.1 | 200 | 4523 |
| 07/Mar/2014:16:10:02 -0800 | John Doe | 64.242.88.10 | GET /mailman/listinfo/hsdivision HTTP/1.1 | 200 | 6291 |
| 07/Mar/2014:16:11:58 -0800 | Steven Baryessa | 64.242.88.10 | GET /twiki/bin/view/TWiki/WikiSyntax HTTP/1.1 | 200 | 7352 |
| 07/Mar/2014:16:20:55 -0800 | John Doe | 64.242.88.10 | GET /twiki/bin/view/Main/DCCAndPostFix HTTP/1.1 | 200 | 5253 |
| 07/Mar/2014:16:23:12 -0800 | John Doe | 64.242.88.10 | GET /twiki/bin/oops/TWiki/AppendixFileSystem?template=oopsmoreá¦m1=1.12á¦m2=1.12 HTTP/1.1 | 200 | 11382 |
| 07/Mar/2014:16:24:16 -0800 | Richard Roe | 68.242.38.10 | GET /twiki/bin/view/Main/PeterThoeny HTTP/1.1 | 200 | 4924 |
| 07/Mar/2014:16:29:16 -0800 | Steven Baryessa | 64.242.88.10 | GET /twiki/bin/edit/Main/Header_checks?topicparent=Main.ConfigurationVariables HTTP/1.1 | 401 | 12851 |
| 07/Mar/2014:16:30:29 -0800 | John Doe | 64.242.88.10 | GET /twiki/bin/attach/Main/OfficeLocations HTTP/1.1 | 401 | 12851 |
| 07/Mar/2014:16:31:48 -0800 | Richard Roe | 68.242.38.10 | GET /twiki/bin/view/TWiki/WebTopicEditTemplate HTTP/1.1 | 200 | 3732 |
| 07/Mar/2014:16:32:50 -0800 | John Doe | 64.242.88.10 | GET /twiki/bin/view/Main/WebChanges HTTP/1.1 | 200 | 40520 |
| 07/Mar/2014:16:33:53 -0800 | Richard Roe | 68.242.38.10 | GET /twiki/bin/edit/Main/Smtpd_etrn_restrictions?topicparent=Main.ConfigurationVariables HTTP/1.1 | 401 | 12851 |
| 07/Mar/2014:16:35:19 -0800 | Leland Stanford | 68.242.38.10 | GET /mailman/listinfo/business HTTP/1.1 | 200 | 6379 |
| 07/Mar/2014:16:36:22 -0800 | Richard Roe | 68.242.38.10 | GET /twiki/bin/rdiff/Main/WebIndex?rev1=1.2&rev2=1.1 HTTP/1.1 | 200 | 46373 |
| 07/Mar/2014:16:37:27 -0800 | Richard Roe | 68.242.38.10 | GET /twiki/bin/view/TWiki/DontNotify HTTP/1.1 | 200 | 4140 |
| 07/Mar/2014:16:39:24 -0800 | Leland Stanford | 68.242.38.10 | GET /twiki/bin/view/Main/TokyoOffice HTTP/1.1 | 200 | 3853 |
| 07/Mar/2014:16:43:54 -0800 | Richard Roe | 68.242.38.10 | GET /twiki/bin/view/Main/MikeMannix HTTP/1.1 | 200 | 3686 |
| 07/Mar/2014:16:45:56 -0800 | Leland Stanford | 68.242.38.10 | GET /twiki/bin/attach/Main/PostfixCommands HTTP/1.1 | 401 | 12846 |
| 07/Mar/2014:16:47:12 -0800 | John Doe | 64.242.88.10 | GET /robots.txt HTTP/1.1 | 200 | 68 |
| 07/Mar/2014:16:47:46 -0800 | Steven Baryessa | 64.242.88.10 | GET /twiki/bin/rdiff/Know/ReadmeFirst?rev1=1.5&rev2=1.4 HTTP/1.1 | 200 | 5724 |
| 07/Mar/2014:16:49:04 -0800 | Steven Baryessa | 64.242.88.10 | GET /twiki/bin/view/Main/TWikiGroups?rev=1.2 HTTP/1.1 | 200 | 5162 |
| 07/Mar/2014:16:50:54 -0800 | Steven Baryessa | 64.242.88.10 | GET /twiki/bin/rdiff/Main/ConfigurationVariables HTTP/1.1 | 200 | 59679 |
| 07/Mar/2014:16:52:35 -0800 | John Doe | 64.242.88.10 | GET /twiki/bin/edit/Main/Flush_service_name?topicparent=Main.ConfigurationVariables HTTP/1.1 | 401 | 12851 |
| 07/Mar/2014:16:53:46 -0800 | John Doe | 64.242.88.10 | GET /twiki/bin/rdiff/TWiki/TWikiRegistration HTTP/1.1 | 200 | 34395 |
| 07/Mar/2014:16:54:55 -0800 | Richard Roe | 68.242.38.10 | GET /twiki/bin/rdiff/Main/NicholasLee HTTP/1.1 | 200 | 7235 |
| 07/Mar/2014:16:56:39 -0800 | Leland Stanford | 68.242.38.10 | GET /twiki/bin/view/Sandbox/WebHome?rev=1.6 HTTP/1.1 | 200 | 8545 |
| 07/Mar/2014:16:58:54 -0800 | Leland Stanford | 68.242.38.10 | GET /mailman/listinfo/administration HTTP/1.1 | 200 | 6459 |

METHOD AND SYSTEM FOR DESIGNING A DATABASE SYSTEM FOR HIGH EVENT RATE, WHILE MAINTAINING PREDICTABLE QUERY PERFORMANCE

FIELD OF THE ART

The present subject matter generally relates to the field of data storage, analysis and manipulation. The disclosure pertains to database system performance. It has applicability to the processing of database storage and querying.

BACKGROUND

A database system performs various functions, including defining data tables in an organized fashion according to a user/customer's requirements and specifications. When such a database is defined on a database system, it operates to accept entered data records for storage as data entries in the database. It must also be able to support user queries, which may specify values within certain fields ("columns") of the stored data, and report back all stored data entries for which the specified columns have the specified values. As needed, the database needs to be able to purge data no longer desired to be kept.

A database system should perform these functions to acceptable levels of performance. That can include, among other things, acceptable query latency times. Different users have different requirements relating to database system performance, and may prioritize their requirements differently. Therefore, a database system may need flexibility as to how it meets the customers' needs.

SUMMARY

A computer-implemented database system, method, and computer program product are provided. the database system comprises a plurality of nodes, each node including a data storage device having memory and a server; and a database system controller coupled to each of the plurality of nodes and having a processor and software program code for directing the database system to perform the following function of defining, for a user, a node group including at least one of the plurality of nodes, upon which the user's data is to be stored in a user database; wherein the user database is defined in terms of time-partitioned tables residing on the nodes of the node group, and wherein each time-partitioned table is further defined in terms of shards of the user's data, the shards corresponding with respective ones of the time partitions. The user data is managed in terms of the shards on respective nodes of the node group, and the time-partitioned tables include a chronologically oldest time-partitioned table and a current time-partitioned table into which a new user data entry will be written. The system further performs the functions of determining whether a predetermined criterion has been met; and, responsive to the detecting that the predetermined criterion has been met, purging all shards of the chronologically oldest time-partitioned table.

Further features and advantages of embodiments of the subject matter disclosed herein, as well as the structure and operation of preferred embodiments, are described in detail below with reference to the accompanying exemplary drawings.

DESCRIPTION OF DRAWINGS

FIG. 9 is an example of a list of data entries that are stored and processed according to embodiments of the present subject matter.

DETAILED DESCRIPTION

Basic Database System Concepts

A database system stores information for retrieval and querying. In general, the data may take the form of entries having multiple fields, in which the values of the various fields vary. Often, multiple entries can have values of a given field in common. Database architecture may take advantage of this commonality by using various tables, in which different entries in one table may all use the same entry in another table, so that the common field value information is not duplicated.

Figure 1:
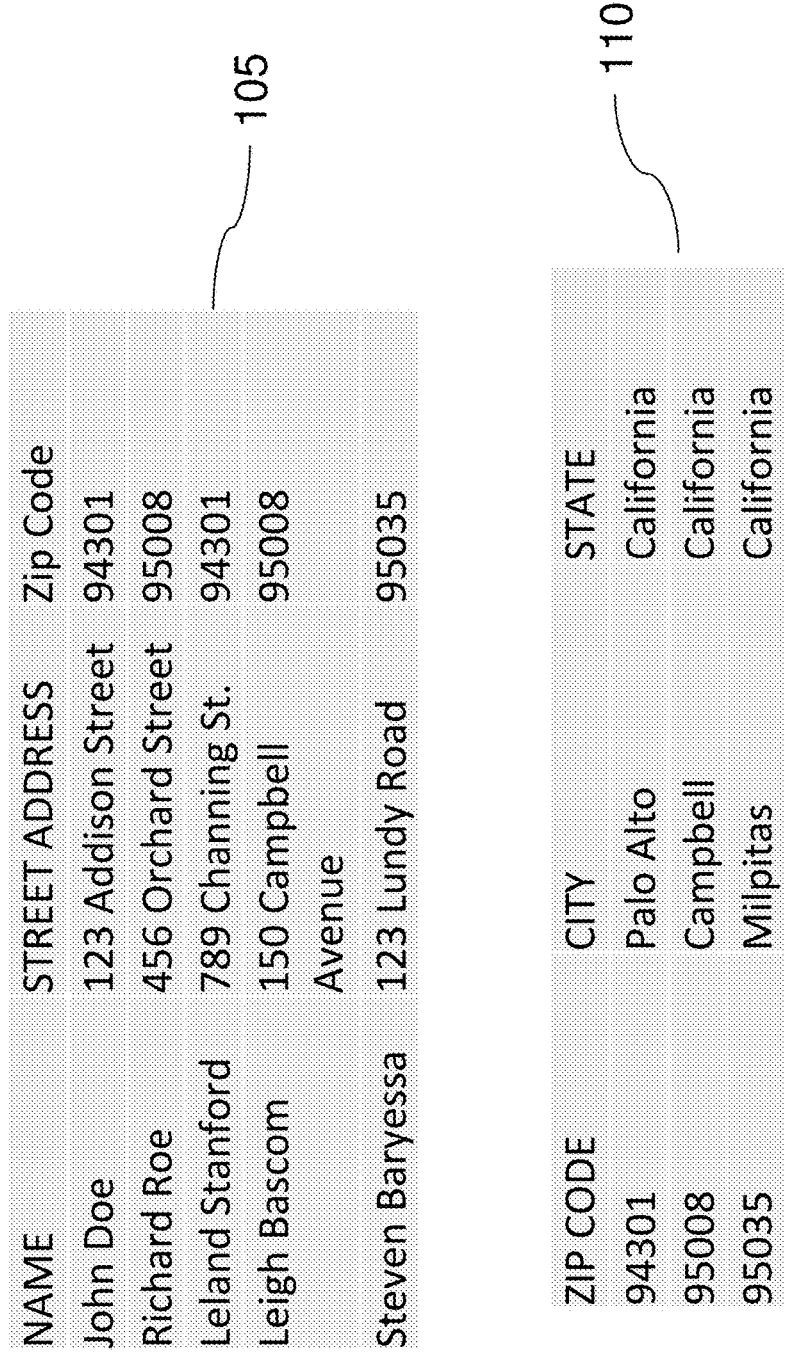
FIG. 1 is a diagram showing an illustrative database made up of two tables.

A simple example is shown in FIG. 1. A database, designed using a database system, stores information about names and addresses. A given entry, also called a record, may include a name, street address, city, state and Zip (postal) code. For the sake of this illustrative example, it is assumed that the entire region of a given Zip code falls within a given city and state. That is, the Zip code 94301 is assumed to fall entirely within the city of Palo Alto Calif. It is assumed that the Zip code 95008 falls entirely within the city of Campbell Calif. It finally is assumed that the Zip code 95035 falls entirely within the city of Milpitas, Calif.

It is common terminology to say that a given entry (also referred to herein as a "record") is a "row" of a database table, and the various data fields of the data entries are "columns." Thus, the name, street address and Zip code fields of the data entries in the table 105 are in respective columns.

Thus, if a database included multiple entries for individuals whose addresses fall within the same city and state, the city, state and Zip code would be redundant within those data entries, and would require additional database system memory.

Relational databases may be designed to avoid such redundancy. For instance, a database made of two tables, shown as 105 and 110, might include a Zip code field in each table. Thus, for instance if multiple data entries include Campbell, Calif. 95008, the table 105 showing the unique names and street addresses may use the Zip code as a cross reference to the table 110, in which there is only one entry for each Zip code value, showing the corresponding city and state values.

From this example, several observations about database system functionality may be understood. First, if a new data entry is entered, representing a new individual name and street address, it may be necessary only to enter the new information into the table 105, if the city, state and Zip code already exist in the table 110.

Second, if data is deleted from the database, it is necessary to check which data, from which tables, may be safely deleted. For instance, if Steven Baryessa is deleted, then there are no longer any entries with the City, State and Zip code Milpitas, Calif. 95035, so the data from both tables 105 and 110 may be deleted. If, on the other hand, Leigh Bascom is deleted from the table 105, Richard Roe still has the address information Campbell, Calif. 95008, so that information cannot be deleted from the table 110. The database system property called "referential integrity" requires that, if an entry in one database table references an entry in another table, the latter table entry must be there. Deleting the latter would be a referential integrity violation.

Third, while it may not be intuitive from the small example illustrated in FIG. 1, databases can get very large. Thus, different tables of a database may be stored on different data storage devices (called "nodes"). Each node typically includes a quantity of computer memory for storing the data, and a processor, which functions as a data server, to control storage, access, and manipulation of the data. Also, data can be partitioned, for instance based on time periods during which the data entries were entered. For instance, a large list of names and addresses (as in the table 105) might be time partitioned into distinct tables for each calendar year in which the entries were entered.

FIG. 9 shows a table of data, which might be called "fact data" or "transition data," which pertains to the data base information shown in FIG. 1. Entries in the Name column of the table 105 of FIG. 1 appear in the login_name column of the table of FIG. 9. Also shown in FIG. 9, among other things, are time stamps, given in the time_stamp column. That data is an illustrated representative of data, such as API traffic data, web logs, etc., which may be supported or produced, for example, by a Web application such as Apache Tomcat. The data of FIG. 9 may, in accordance with an embodiment, be stored and processed. As will be discussed further, data partitioning or sharding may be done according to specified time intervals, within which the time stamps for various data entries of FIG. 9 fall.

Figure 3:
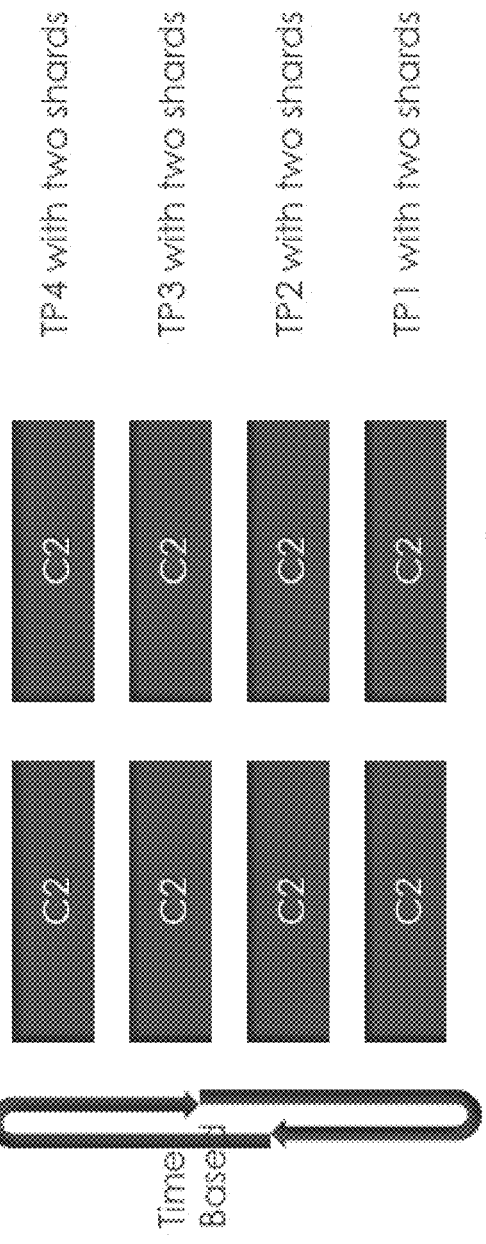

FIG. 3 is a schematic representation of a database system in which two nodes, designated N1 and N2, store data from one customer, designated C2, in separate time partitioned shards (terminology to be defined below). The time periods are designated TP1 through TP4, and could represent recognizable time periods such as calendar years, fiscal quarters, etc.

Figure 4:
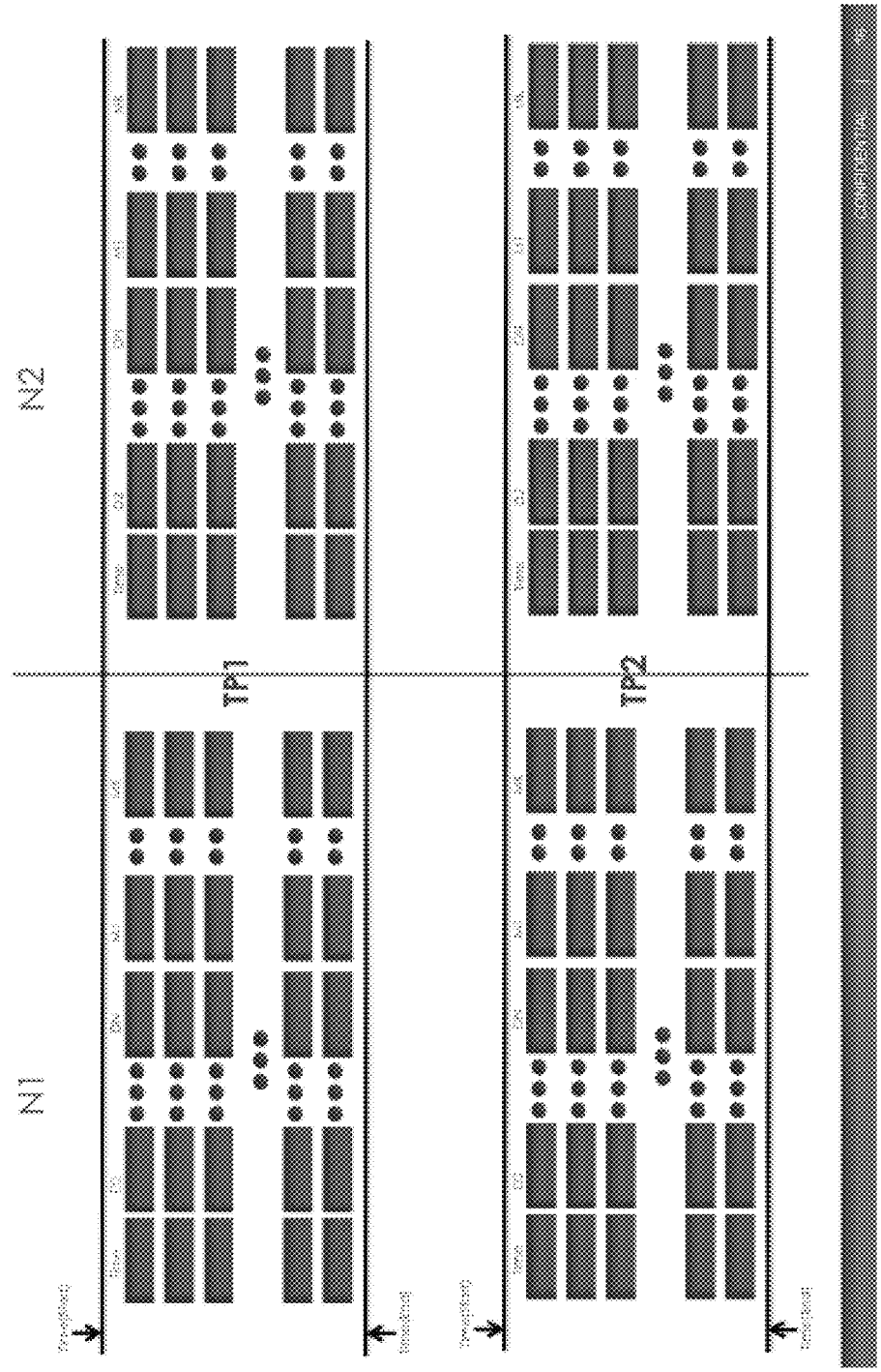

FIG. 4 shows a more detailed schematic representation of two nodes, designated N1 and N2, in which a customer's data is broken down into time partitioned tables based on partitioned time periods TP1 and TP2. FIG. 4 shows the data in individual records, in schematic form.

Fourth, data access in a very large database can be time-consuming. Therefore, techniques have been used to try to improve data access performance. For instance, some data entries might be accessed more often than others. If so, then an index can be defined, which points to the more frequently accessed entries, in order to access them more quickly. The index might, for instance, alphabetize the names of the entries in the Name column of the table 105, to help find a given individual, by name, more quickly.

Multiple indexes (or "indices") may be used, in which each index defines a different ordering of the records. For instance, an employee database may have several indexes, based on the information being sought. A name index may order employees alphabetically by last name, while a department index may order employees by their department. A key is specified in each index, the key typically being the value of one of the columns. For an alphabetical index of employee names, the last name field could be the key.

Unfortunately, however, there can be a tradeoff that data entries that are not part of the index can suffer longer access times. Thus, choosing indices carefully, and updating them as necessary, may improve latency times for the user accessing the data.

Fifth, it is sometimes necessary to manage the size of a database by purging entries, as opposed to deleting them individually as they are no longer needed. For instance, data beyond a certain age might be routinely purged. Thus, time-partitioning tables may make it possible simply to delete a table of older entries that are to be purged. The concept of time partitions available in database technology will be used, in order to manage the data in terms of time partitions. Partitions may then be dropped under suitable conditions, such as when they reach a certain age. By contrast, conventional database system operation has included deleting individual records. In an embodiment, however, deleting by partitions is fast, and does not impact the database performance.

Partitioning and Sharding

For the purpose of the present subject matter, a concept somewhat related, or analogous, to partitioning, that is called "sharding," will be referred to. Sharding is here defined as distributing records or data for one customer or one type across different database servers. In the present subject matter, shards are implemented as data, for a given customer or type, which resides on respective database nodes. Shards may be defined in terms of time partitions, as is the case with partitions, but a given time partition will consist of a number of shards equal to the number of nodes, upon which portions of that time partition reside. Keeping the various shards of a database for a customer or type relatively small, may decrease the query latency time. Also, shards may easily be distributed over multiple data storage devices, and their access may then be supported by multiple processors that operate the multiple data storage devices, again improving query latency time.

The word "shard," in a more general sense, may be defined as a small part of a whole. Sharding a database may be defined as breaking up the big database into many, much smaller databases that share no redundant data, that can be spread across multiple servers, and which have some sort or unifying attribute, beyond that of mere partitioning by time, etc., which may be expressed in terms of a particular customer, a particular type, etc.

Sharding can be considered analogous to horizontal partitioning; that is, analogous to partitioning by rows. In practice, the term is often used to refer to any database partitioning that is meant to make a very large database more manageable. However, it should be understood that partitioning and sharding are different, in that sharding gives a more specific and detailed basis for distinguishing, by content, type, customer, etc., which data shall be within or outside the shard. By contrast, partitioning is broad, and generally pertains only to one given parameter, such as time, and does not necessarily take into account whether single or multiple servers or storage devices are employed.

The advantageousness of sharding is based on the idea that, as the size of a database and the number of transactions per unit of time made on the database increase linearly, the response time for querying the database increases at a faster rate, such as exponentially.

Additionally, the costs of creating and maintaining a very large database in one place, such as on one server or data storage device, can increase exponentially, because the database will need to be supported by expensive, high-end computers. In contrast, data shards can be distributed across a number of much less expensive commodity servers. Data shards have comparatively little restriction as far as hardware and software requirements are concerned.

In some cases, database sharding can be done fairly simply. One common example is splitting a customer database geographically. Customers located on the East Coast can be placed on one server, while customers on the West Coast can be placed on a second server. The database programmer may specify explicit sharding rules, to determine on which machines any given piece of data, or category of data, will be stored. Assuming there are no complicating factors, such as, in the above example, customers with multiple locations, the split is easy to maintain and build rules around.

In accordance with an embodiment, shards are partitioned based on the periods of time during which the data records were received form storage in the database. This "time partitioning" is discussed herein, and illustrated in the accompanying drawings.

Data sharding can be a more complex process in some scenarios, however. Sharding a database that holds less structured data, for example, can be very complicated, and the resulting shards may be difficult to maintain.

Data volume growth, or transaction growth, represent another challenge which may be address by embodiments of the present subject matter. Consider, for instance, a partitioning model in which events are sharded across five database nodes. Suppose that it is necessary to expand to a sixth node (because of disk capacity, query capacity, or higher insertion rates). In traditional database systems, it is extremely difficult to do so, because now all old records (or potentially $5/6^{th}$ of the old records) can get remapped to a different node, resulting in a lot of disruption to the database performance. However, in accordance with an embodiment, shards and node groups can be used to handle data volume growth, while maintaining a good query response time.

Database System Objectives and Performance

With the above database system concepts in mind, it will be seen that the performance of a database can depend on multiple factors, which sometimes conflict with each other.

First, data volume may, in many cases, be greater than what one database server can handle with suitable performance. Thus, multiple nodes may be used, to provide greater data capacity or greater processing power for data entry, queries, etc.

Some database systems may, for instance, treat the primary objective as being optimizing query performance, such as by minimizing query latency time. A database query typically is a complete select statement that specifies 1) the columns and tables from which data is to be retrieved, 2) optionally, conditions that the data must satisfy, 3) optionally, computations that are to be performed on the retrieved column values, and 4) optionally, a desired ordering of the result set.

Indexing strategies, and data partitioning (sharding) algorithms may be used to try to achieve such query performance optimization. However, indexing can bring down the rate at which new records are added to the database, by increasing the processing overhead associated with the new record entry. Thus, to maintain a desired high rate of new record insertion, it may be necessary to shard the records over multiple database nodes, to utilize the additional processing power that supports the multiple nodes.

Also, indexing is sometimes designed to optimize for the most commonly occurring queries. Thus, other queries may have longer latency times, decreasing the overall performance. Database system administrators can fine-tune the available indexes, to try to optimize overall performance and performance as to the most frequently occurring queries, but without adding so much overhead as to slow down overall performance.

Additionally, some database users may require that data be purged if it has reached a specified age since it was first entered, or if the user's data capacity has been reached. The purging may take place frequently, or it may become necessary at times when the nodes and servers are otherwise occupied with other tasks. Therefore ease and efficiency of purging are desirable. If shards are implemented using the concept of time partitions, shards older than a specific time period are easily and efficiently purged, or "dropped."

While optimal query performance can be desirable, and the use of indexes may further improve query performance at least some of the time, it may sometimes be the case that predictability of query performance best meets a customer's needs.

In accordance with an embodiment, a database system is provided, in which a combination of a defined user group of database system nodes and time-partitioned data tables achieves desirable query performance, while allowing for quick and easy purging of the oldest data and for maintenance of desirably high insert rate.

The customer (user), when registering as a customer of the database system, will be allocated data storage space on the system. That space may be specified in terms of preconfigured dimensions. The customer may contract for the space based on need and payment, for instance in terms of dimensions and measures of the data, and number of indexes the user might employ to query for data records. If the user's dimensional representation is sufficiently large, then the database system might include a separate dimensional table.

In an embodiment, the user is assigned a node group, consisting of space on one or more nodes of the database system. For instance, different distinct database tables, such as 105 and 110 of FIG. 1, might be resident on different nodes. Alternatively, different columns of a single table might reside on different nodes. Thus, accessing a given data record might involve reading different columns of the record from different nodes.

Figure 2:
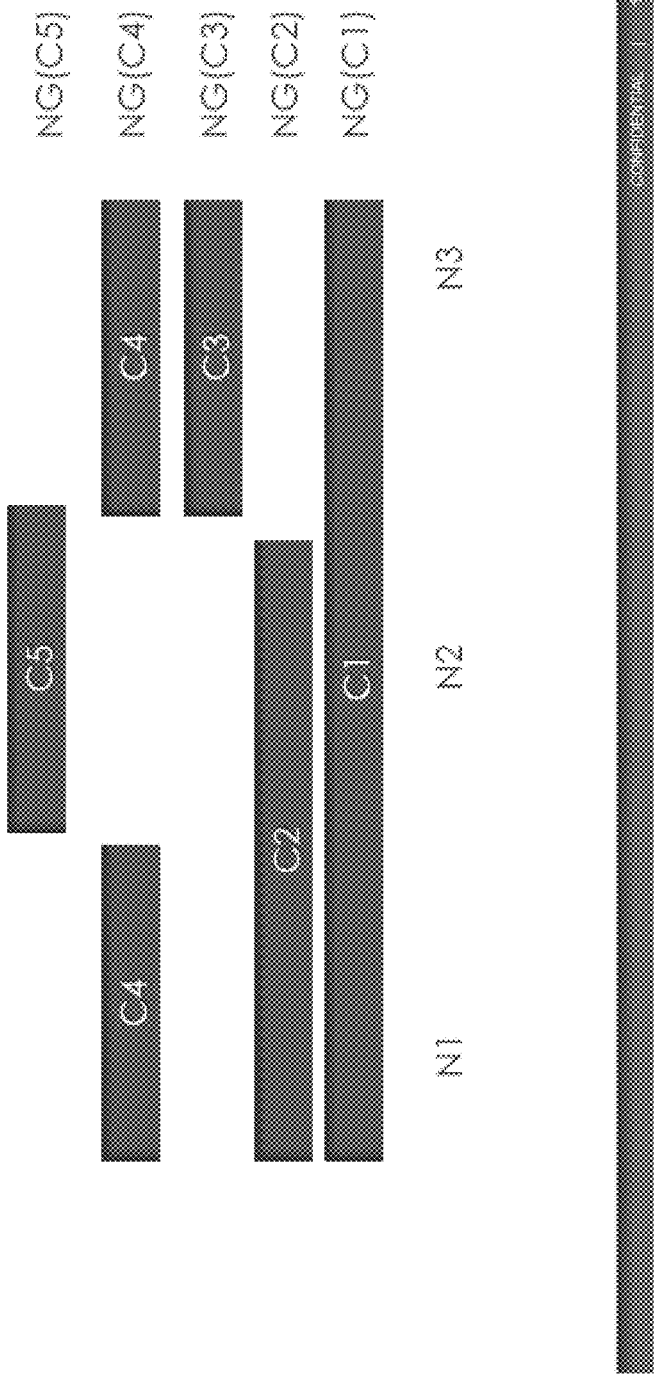
FIGS. 2, 3, and 4 are schematic diagrams of a database showing multiple shards within multiple data storage nodes.

FIG. 2 is a schematic representation of a database system having three nodes, designated N1 through N3, in which five customers, designated C1 through C5, are allocated space.

A given customer's node group will include as many, or as few, nodes as are reasonably required to meet the customer's needs, without undue cost to the customer. The system administrator may also take into consideration how to meet the customer's needs, while enabling the overall database system to keep up with the system's transaction rate, and maintain an acceptable physical insert speed. This could depend on factors such as the customer's data volume, and security considerations that might make it appropriate to isolate the customer's node group from nodes storing data of other customers.

In an embodiment, data purging based on age of data is optimized by designing the customer's node group and data shards in terms of time partitions based on a time factor such as date and time the data record was entered into the database. Then, purging the oldest data may be done simply by purging the oldest data shard or shards. That is, purging may comprise dropping the oldest shard or shards for a particular time-partition or time-partitions.

A data purge can be responsive to the current data shard becoming full, responsive to the oldest data reaching a certain age, such as a specified number of months, etc.

Database System Design

An example of a database system, designed according to an embodiment of the present subject matter, will be described in detail. Databases are designed according to an organization of data as a blueprint of how a database is constructed; for instance, divided into database tables. This sort of database definition is referred to as a "schema," and describes the structure of a database system in a formal language which is supported by the database management system (DBMS). In the present description, an exemplary schema will be referred to by the algebraic expression "Schema($C_I$)."

Figure 6:
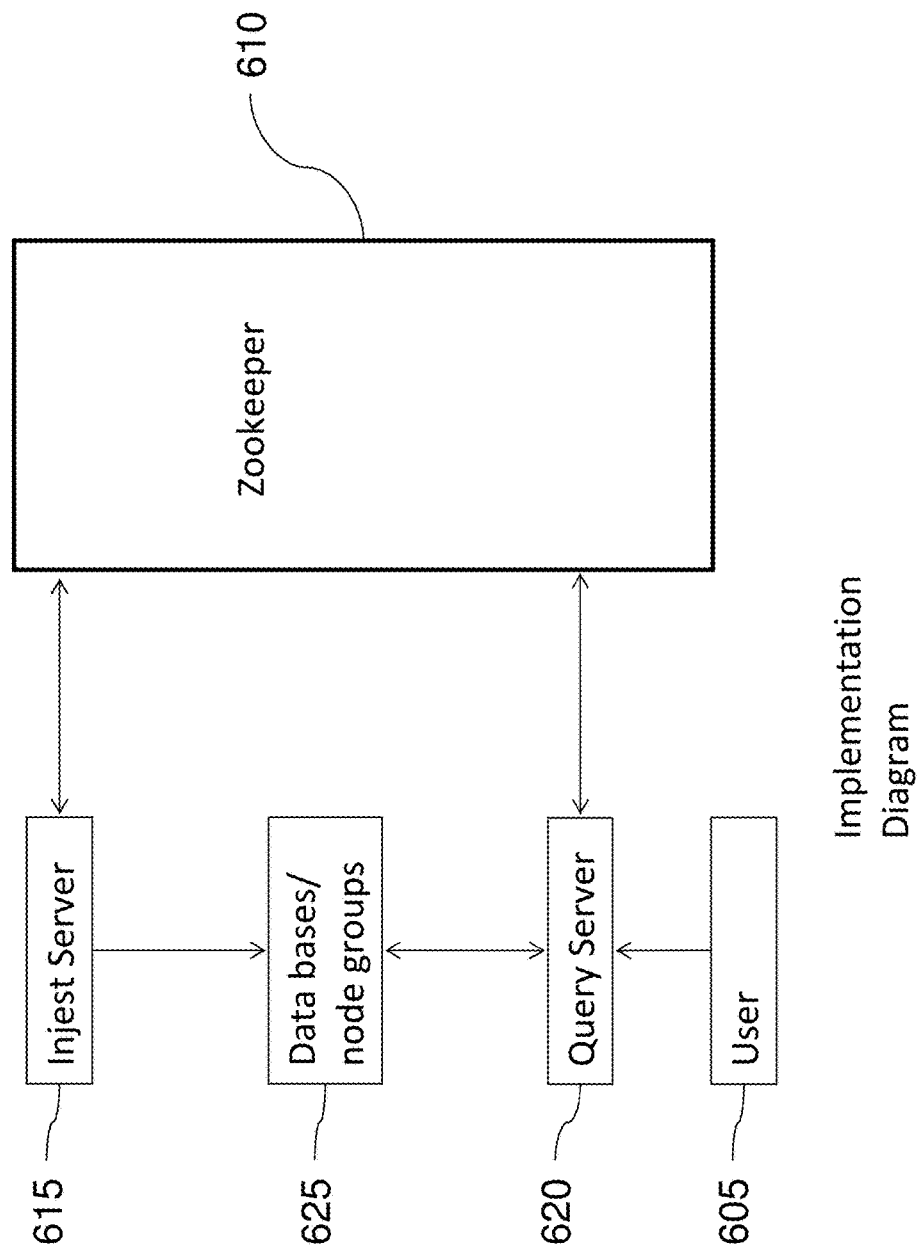
FIG. 6 is a high-level system block diagram of a system according to an embodiment.

FIG. 6 is a high-level block diagram of an electronic database processing device architecture which will be described in connection with the embodiment under discussion. A user 605 employs the electronic database processing device of FIG. 6 to work with a database stored as a data entity. A coordination and synchronization server therefor is here referred to by the name "Zookeeper," and is designated as 610 in FIG. 6. Zookeeper will be used to coordinate various things, for instance, instructing the ingest-server to insert into a new time-partition, add or remove columns into or from the fact table, etc. Zookeeper is also used to store various configuration details, like nodegroup details, etc. The name "Zookeeper" refers to a software project of the Apache Software Foundation. The Apache Zookeeper provides an open source distributed configuration service, synchronization service, and naming registry for large distributed systems. Zookeeper's architecture supports high availability through redundant services. The clients can thus ask another Zookeeper node if the first node fails to answer. Zookeeper nodes store their data in a hierarchical name space, much like a file system or a digital tree data structure. Clients can read and write from/to the nodes and in this way have a shared configuration service. Updates are totally ordered. Within the spirit and scope of the present subject matter, other equivalent software implementations may be used in place of the Zookeeper that is specifically referred to herein. Implementations other than Zookeeper may employ a pull model in order to look up for state, as opposed to being communicated by the Zookeeper (that is, a push model).

The Zookeeper 610 received database content updates through an Ingest server 615. Data ingestion is the process of obtaining, importing, and processing data for later use or storage in a database. This process often involves altering individual files by editing their content and/or formatting them to fit into a larger document. Queries to the database content are received, and results are provided, through a Query server 620. Databases/node groups 625 schematically represent the data storage devices within which the database content updates are entered, and through which the queries are processed.

For convenient explanation and understanding, a simplifying assumption may be made, that the Schema($C_I$) is assumed to contain only one set of tables. Further, it may be assumed for the sake of the example that the tables contain "FACTS" which are defined, as per database terminology, as factual data, such as sales or cost data or other business measures, etc. The tables may additionally contain indexes associated with those FACT tables, or other suitable integrity constraints.

For the present example, there will be only one table, which for discussion purposes will be designated "$C_I$.FACT". (Multiple FACT tables may also be employed, as discussed below in connection with Time Partitions.) Multi-part naming (using the schema name $C_I$) will be used to disambiguate the tables for different customers on the same node. (Each customer will have their own schema (in the SQL sense), $C_I$, allowing for such flexibility.)

The customer will get a set of preconfigured dimensions and can add as many dimensions and measures as they pay for, and as many indexes on these dimensions that they pay for (see the cost description later). A separate dimensional table is created only when the dimensional representation is very large (like for URI's). In such a case, a separate "hash table" maps the lengthy expressions as they get stored in the FACT table.

The Schema design (table and index definitions) of the Schema($C_I$) for the customer will be stored in the Zookeeper 610.

A customer, based on the above characteristics, and a few other things described later, will have a Class($C_I$). The Class($C_I$) is stored in the Zookeeper 610.

Customer Data on Nodes: "Nodegroups"

In an embodiment, a customer is not forced to be on only one node. This facilitates keeping up with the transaction rate, since otherwise the physical insert speed can hinder the transaction rate.

Also in an embodiment, every customer is not forced to be on all nodes. The reasons are as follows:

Some customers will not have enough data to justify occupying multiple nodes.

Customers might be divided into classes, and in those cases it might be considered desirable to separate the physical nodes by customer class.

To accommodate these considerations relating to customer allocation over multiple nodes, there will be defined the concept of the group of nodes employed by a database system, or "nodegroup." Again employing algebraic terminology, the nodes used to hold data of a customer $C_I$ will be referred to as belonging to a nodegroup NG($C_I$). Specifically customer data occupying subsets of the nodes making up subsets designated algebraically as Subset$\{N_1 \ldots N_2\}$ for customers $N_1 \ldots N_2$. The nodegroup NG($C_I$) is also stored in the Zookeeper 610.

It is an objective to be able to purge large amounts of information easily, as needed. The simplest way to do so is to drop entire tables from the database. If, for instance, it is desired to keep the last 12 months, and to drop the older information, the easiest way is to have a nodegroup which is composed of a series of "time partitions (TP)." A time partition goes across all the nodes of a nodegroup. Each TP contains all the records of some particular time interval for the customer that is in that nodegroup. For concept/terminology level, the fraction of the TP that is stored on any one given node will be referred to as a "shard" of that TP.

FIG. 2 illustrates an example of such nodegrouping. Three nodes, $N_1$ through $N_2$, store data for five customers $C_1$ through $C_5$. Five nodegroups, designated NG($C_1$) through NG($C_5$), store respective customer data on various subsets of the three nodes, as shown.

In addition to the partitioning by customer and by node that are shown in FIG. 2, time partitioning (TP) may additionally be done.

From a representation purpose, $TP_j(C_I)$ represents the $j^{th}$ time partition for the schema $C_I$. Also, assume that there is a maxTP($C_I$) representing the maximum number of time partitions for a given customer. The value of maxTP($C_I$) is stored in the Zookeeper 610. The time partition $TP_j(C_I)$ exists on all nodes in the node group NG($C_I$). The fraction of the time partition $TP_j(C_I)$ that exists on a node $N_K$, where the node $N_K$ is in the node group NG($C_I$), is designated algebraically as a shard ($TP_j(C_I)$).

At any point in time, there is a current time partition $TP_{cur}$ ($C_I$) that contains the most recently entered records, and into which new data entries are being inserted. The current schema cur($C_I$) is stored in Zookeeper 610. When any shard of $TP_{cur}(C_I)$ becomes full, then $TP_{cur}$ ($C_I$) is now declared to be full. In general, because of the randomized inserts, all shards of this, or any given time partition, will become full at approximately the same time.

A new time partition is initiated, and its designation value is given as (cur+1) mod maxTP($C_I$). Also, when maxTP($C_I$) TPs become full, (and from then on), the oldest time partition is dropped. The time partitions are maintained, for instance, as a circular linked list, and accordingly, they are numbered using a modulo numbering system, as shown in the expression (cur+1) mod maxTP($C_I$) just mentioned. Alternatives to the circular linked list implementation of time partitions include, for instance, a monotonically increasing entity such as a current system date-time tagging/stamping arrangement, or an automatically generated ever increasing address or index number, etc. Yet additional implementations are possible, if they may be dropped at will when the purge interval is achieved.

Referring now to FIG. 3, it will be explained how the above-discussed concepts, of (i) defining shards in terms of time partitions and other factors, and (ii) managing user data in terms of shards across nodes, are combined in accordance with an embodiment. In accordance with such an embodiment, shards and node groups can be used to handle data volume growth, including data purging based on considerations such as age; and yet a good query response time is maintained.

To simplify, it is assumed that a first dimension $D_1$ is "time." In reality, it may be the case that the timestamp of insertion of a database record will be some other logical time that may be chosen for the convenience of the particular user, or embodiment.

As shown schematically in FIG. 3, a time partition, over a node group of two nodes N1 and N2, has four time partitions $TP_1$ through $TP_4$. The result is that there are eight shards.

Note that time partition starting times $Time_{Start}$ ($TP_J(C_I)$) and $Time_{End}$ ($TP_J(C_I)$), while being a characteristic of any given time-partitioned shard such as $TP_J(C_I)$, are nevertheless the same across all the shards of a given time partition. That is, the time is associated with a TP, not merely associated with any one shard of the TP. $Time_{Start}$ ($TP_J(C_I)$) and $Time_{End}$ ($TP_J(C_I)$) are stored in Zookeeper 610.

A Database Query

There will now be a discussion of how sharding and node groups are used, in order to have good (that is, fast) query response time. Query response time may primarily measure query processing time. In an embodiment, the query is forked, in parallel, into multiple sub queries, which will be sent to individual nodes holding the shards for a given customer and for the given time partition. The results from these nodes are then merged and aggregated by the query node.

In an embodiment, a query is processed by simply looking up information in the Zookeeper 610 to determine which time partitions and nodegroups which store this customer's data are needed to answer the query. That information may, for instance, be cached locally on a query node which receives the query from the customer. Also, it may be the case that the query is specified in terms of a column value which reflects the chronology of the data records, and which is a basis for the time partitioning. Once the Query Server retrieves nodegroups (that is, the list of database servers) for a particular customer, all it requires is the start_time and end_time that is given by the user. The database system can now fetch the records from the right time-partitions given this information. In an embodiment, all time partitions are selected by default, unless the query specifies fewer than all of the time partitions. All queries will go against all nodes, for all TPs, that could possibly contain information that is of interest to the query.

After the data entries are obtained from all shards of the database, the obtained data entries are aggregated. Conventional aggregation techniques may be used. in an embodiment, however, the query request is processed by a split and aggregation logic software module to generate a query, for instance in the Structured Query Language (SQL), which accesses all shards for the desired time partition or partitions, and collects the results, aggregates them, and returns the result as a query response. This is shown schematically in FIG. 5.

Figure 5:
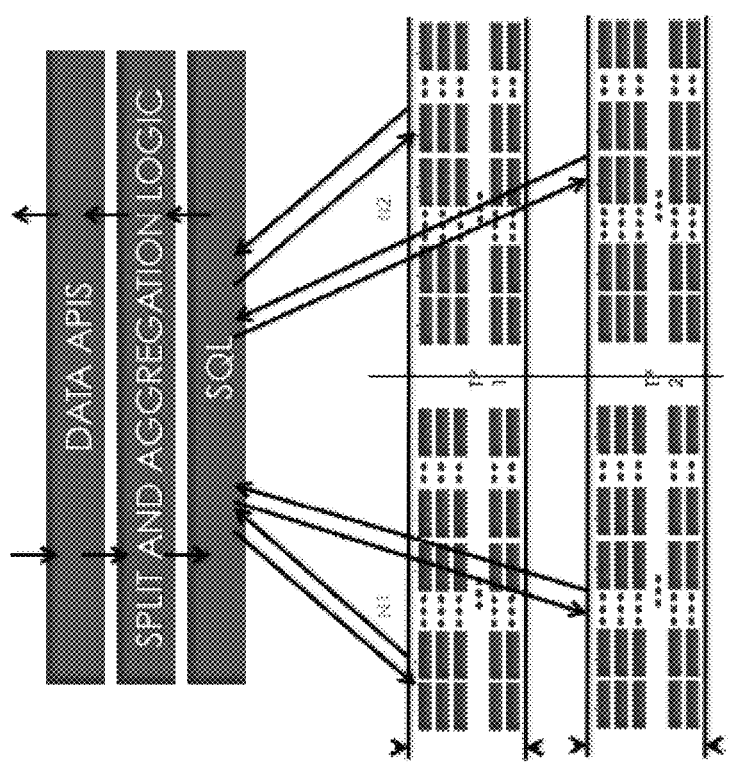
FIG. 5 is a schematic diagram showing query processing.

In an embodiment, the aggregation is done in three steps, which can be understood in terms of sets of arrows shown in FIG. 5, overlaying the modules and shards shown schematically.

A first step is represented by downward-facing arrows on the upper left of FIG. 5, crossing the DATA APIS, SPLIT AND AGGREGATION LOGIC, and SQL (structured query language) boxes. In this step, a request to data API is processed by a split and aggregation logic that generates a query in SQL.

A second step is represented by the diagonal arrows which move to and from the various time partitions and shards in the lower part of FIG. 5. Commonly, if a given TP is searched, then all of the shards relevant to that TP are searched.

A third step is represented by the upward-facing arrows in the upper right portion of FIG. 5. On the upward path, query results (answers) are collected, aggregated, and returned to the user who initiated the query.

In connection with the second step just described, further aspects of the query processing will now be described.

As discussed above, query processing includes a lookup of the Zookeeper information (assumed cached locally on the Query Node that gets the query) to understand the time partitions (TPs) which are needed to answer the query. If the key on which TPs are created is in the query, then some TP's are selected. The query proceeds generally as follows:

1. The user's query will have a start_time and end_time (if not present in the query, some default start_time and end_time is picked)
2. Once the start_time and end_time is known, the nodegroups for the user in question are obtained from Zookeeper.
3. Then, the Query Server constructs an SQL query constrained by the "user", "start_time", "end_time" and this query accesses the required nodegroups in parallel. The query access in the third step may include forking the query, in parallel, into multiple sub queries which are sent to individual nodes holding the shards for a given customer and for the given time period.

After the base information is collected from all shards of all TPs, global aggregations are done. That is, with reference to the data records of the database that are collected for the query, time partitions (assuming that the time value is not part of the query) are disregarded. In general, a partitioned database system is capable of addressing these issues. However, in an embodiment the desired characteristics are achieved by aggregation.

The three steps shown in FIG. 5 and described above implement the aggregation as follows: On the down path (first step), a request to data API is processed by a split and aggregation logic that generates SQL (second step) across the various TPs and the relevant shards (typically all) for that TP. On the upward path (third step), the results are collected, aggregated, and returned as the answers to the query.

Customer Classes

The database system may classify the customer into one of a plurality of customer classes, where each customer class is defined in terms of factors such as the level of service provided, the amount of data storage space provided, which may include a time partition data storage period, a number of custom variables, such as dimensions, measures, etc., the customer's database will require, a transaction rate defined in terms of the volume of queries and number of queries that might be concurrently executed in parallel, new data entries, etc., the number and type of indexes into the customer's database, and the price the customer is willing to pay for the service.

The class might also be defined in terms of the complexity of the queries that will be used to access the customer's database data. Query complexity may be defined in different ways, but generally relates to the number of data records that are accessed by the query, as well as the number of records in the query result. For example, if a query is directed to specified values within two of the columns of the customer database, the query must access all records that satisfy either one of the columns, and then do an intersection of the two result sets to determine which records satisfy both of the search criteria. It may be said more broadly, then, that query complexity is related to the union of all records that satisfy any of the query criteria, even if the query result is a smaller set, such as an intersection, of those results.

In an embodiment, the database system stores the class definitions for all customers. The database system, or its administrator, must make sure the system has the capacity to satisfy all customer requirements by class. Costs to the customers, if assessed accordingly, allow the system to operate while meeting expense and revenue objectives.

Once again employing algebraic expressions for the purpose of discussion, we will assign a customer $C_I$ to a Class($C_I$) from a set of classes $\{Class_1, \ldots, Class_N\}$. The class assignment may be based, for instance, on what the customer $C_I$ is willing to pay. Each of the classes $Class_J$ has a customer price, designated $Price_J$, which will be charged to the customer $C_I$. The customer price $Price_J$ itself may be related to the database vendor's costs.

A discussion of customer costs may assist in understanding an exemplary class structure. Cost of operations may, for instance, be substantially determined by the integral or fractional number of EC2 (Amazon Webservices' "Elastic Compute Cloud") instances that are needed to support the customer. Alternatively, the implementation could be run and hosted on Rackspace, or on any public cloud service provider, or could be run on any internal or private cloud. The following factors go into the number of EC2 instances needed:

1. Transaction rate: If, for instance, one system server can handle 1000 inserts/sec, and here are 5000 transactions per second, then five servers are needed to just keep up with the transaction rate. The customer transaction rate will here be represented by the algebraic symbol T. In various embodiments, the transactions may be managed by an external message broker, such as the Apache Qpid open source messaging broker.

2. Number of fields (dimensions and measures): The greater the number of fields or variables in the table, the slower the insert rate, and the more nodes that are needed to keep up with the gateway traffic. The number will be designated as F, the "fatness" of the table.

3. Indexing on these variables: Indexes help improve query performance, but they cost space and slow down the insert speeds. The number of indexes will be represented by the symbol I.

4. Amount of data stored: The amount can be defined in various terms, but for convenient example, it will be given in terms of a time interval, thus lending itself to time partitioning. Keeping 5 days of data, for instance, is less expensive than keeping five years. This amount of data, which in this example can be considered as history, will be represented as the symbol H.

5. Complexity of the queries: Complexity may itself be complex to measure, but in some ways it is proportional to the number of records touched in the database, more so than the number of records in the final answer. Suppose, for instance, that a query addressed two record fields, which could alternatively be referred to as "dimensions." If the query specifies values for each of the two dimensions, such as dim1=x and dim2=y, then the database will have to search, separately, on the records that qualify for either one of the two conditions, and then do a Boolean intersection of the two sets of results, to determine which of the records satisfy both of the dimension criteria. That Boolean intersection will be smaller than or equal to the Boolean union of the two separate sets of results for the criteria taken individually. The complexity of the queries will be represented by the symbol X, which may for instance be defined as the fraction of the history H (see above) that is touched in a query. Other factors may further refine the complexity X.

6. Concurrent queries: The more the queries are executed in parallel with inserts, the more system resources will be drawn into play, and the greater the cost. This is represented by the symbol Q.

In summary, the Cost is a function of the above-listed variables: f(T, F, I, H, X, Q). It will be seen, then, that if any of these variables increase in value, the cost increases. Customer classes may thus be defined in terms of cost ranges, in terms of weighted values for the variables, etc.

To avoid excessive cost complexity for the customer, in an embodiment there may be some suitable, finite set of classes, represented algebraically by the set $\{Class_1, \ldots, Class_N\}$, with a corresponding price structure $\{Price_1, \ldots, Price_N\}$. As an example, three classes could be defined simply as Small, Medium and Large, or as Gold, Silver and Bronze, etc. Their configurations might, for instance, be something like this:

1. Small: T<500, F<10, I<5, H<1 month, X="temporal queries only with time period<1 day", Q=2 with no sharding
2. Medium: some other parameters
3. Large: Some other parameters where the customer is charged on multiples of 1000 TPS The Class Definitions and Pricing for the classes will be stored in Zookeeper.

For each of these choices, regardless of how they are defined in any particular embodiment, the cost of the implementation will be measured. The price actually charged to the customer may need to have sufficient margins above the calculated cost.

Additional Aspects of System Operation

Embodiments may be implemented on database systems such as the PostreSQLQL open source database system. Other relational data base management systems (RDBMS) that support time-partitions, for instance, Oracle database systems, may be used. A PostreSQL server may for instance be configured as follows:
1. Decide on the number of nodes (represented here by the variable "z") of the PostreSQL server.
2. A number "z" of EC2 instances are created, for instance by a datacenter automation and server management tool such as Puppet, or any other open source or commercial or homegrown datacenter and server management tool. Possible alternatives include open source tools like "Ansible" or "Cheff".
3. For each instance, the datacenter management tool initializes PostreSQL with the setup parameters. This includes, for instance, setting up EBS (Amazon Webservices' "Elastic Block Storage").
4. IP addresses of the "z" umber of EC2 instances are stored in Zookeeper.
5. The servers are monitored, using a suitable tool such as the Nagios open source software application, which offers computer system, monitoring, network monitoring and infrastructure monitoring.

If system capacity reaches a predetermined threshold, then the system may increase the number of nodes, by defining additional servers supporting additional data storage devices. This may be done, for instance, as follows:
1. When the system capacity reaches some threshold, Nagios generates alerts which can be used to create "n" more EC2 nodes, where the variable n may be one at a time, but may alternatively be greater than one, so as to allow the number of nodes to grow in quanta.
2. Puppet does steps 3, 4 and 5 discussed just above, in connection with PostreSQL.
3. The IP addresses of the new servers (in this context, server and node mean the same thing) are put into Zookeeper.

In the event that a node ceases to function, the system may deal with the node failure as follows:
1. Nagios will have some threshold that will determine that the server is dead. The threshold may, for instance, be a time period over which the node fails to respond to a communication from another system component.
2. The system, or a suitable controller, or the Nagios application, will inform Zookeeper that the node is dead.
3. The database system will come to know that the node is dead, and they will have to declare the queries that are in flight, and that involve communicating with that node, to return an error.
4. All inflight messages from the node's message broker, such as Qpid, will be assumed to be lost. Message brokers act as places to buffer (in-memory or on-disk or both) the incoming messages. In an embodiment, the incoming transactional messages are 'parked' in the message broker first. Because database writes can be slow, or there may be network outage, there is a need for a place to safely park messages and insert at a later time when the network connectivity is restored.
5. Nagios generates alerts which can be used to launch a new EC2 node, and Puppet performs steps 3, 4 and 5 from above. The new node will be mounted with the EBS of the old node.
6. Eventually Qpid will start routing data to this new node. Because of transient issues, a small number of messages would have been lost. Therefore the new queries that touch this new node may not return exactly the right answers, whenever the query needs data records that might have been lost.

If a new customer is entered into the database system, a process may take place, such as the following:
1. Fetch Class($C_I$) from Zookeeper.
2. Determine a node group NG($C_I$) (calculation given later)
3. Generate a Schema($C_I$) through an administrative user interface, ensuring that any applicable class policies are followed.
4. For each node $N_K$ (where $N_K$ is in the node group NG($C_I$)) perform the following steps:

For each of the time partitions given by the expression i in $\{0, \ldots, \text{maxTP}(C_I)\}$ Create PostreSQL Schema($C_I$). This includes:
1. Creating maxTP($C_I$) copies of the FACT table and index.
2. For the earliest time partition, where cur=0; set the starting tables and index.
3. Set the gateway to collect and send the right information.
4. The node group NG($C_I$) information should already have passed to the Qpid servers, so operation should be correct.

If a customer's data requirements make it necessary to add one or more additional nodes, assuming the customer's class terms and conditions permit, a process such as the following may take place:
1. Add the new node to the node group NG($C_I$).
2. Record the time at which the new node was added. This denotes that there are several node groups NG($C_I$), separated by time intervals at which they became valid.
3. For each time partition, perform the Create PostreSQL Schema($C_I$) steps, listed above, on the new node.
4. The new node group NG($C_I$) information would already have passed to the Qpid servers, so they should be doing the right thing.
5. Insert records.
6. It should not be necessary to rebalance. Rebalancing is preferably avoided, because of its detrimental effect on performance. Even if some shards of a TP are less loaded than others, once that TP is full, balance will be restored from that point onwards.

If there is a need to perform a schema change for a customer, to grow the customer (again, assuming class restrictions permit), then a process or doing so may raise challenges: Some simple techniques for doing so may be destructive to data records, parameters, etc.

Other techniques may be additive. That is, from the current time, some new dimensions and measures get added. Make changes to Schema ($C_I$), and record the time from which that schema was valid. In effect, we will allow those new things to surface in the user interface if and only if the time request for the query is on the range that contains these new changes. Thus, just like the node group NG(C), the schema ($C_I$) will also have time periods of validity.

Operation of an Embodiment

In accordance with an embodiment, there is provided the combination of a defined node group for the user database, and the use of purging by partition, for instance by purging the oldest time partitioned shard. Shards and node groups are used to solve query performance problems that can arise because of the combination of increased data ingest rate and data volume growth.

Figure 7:
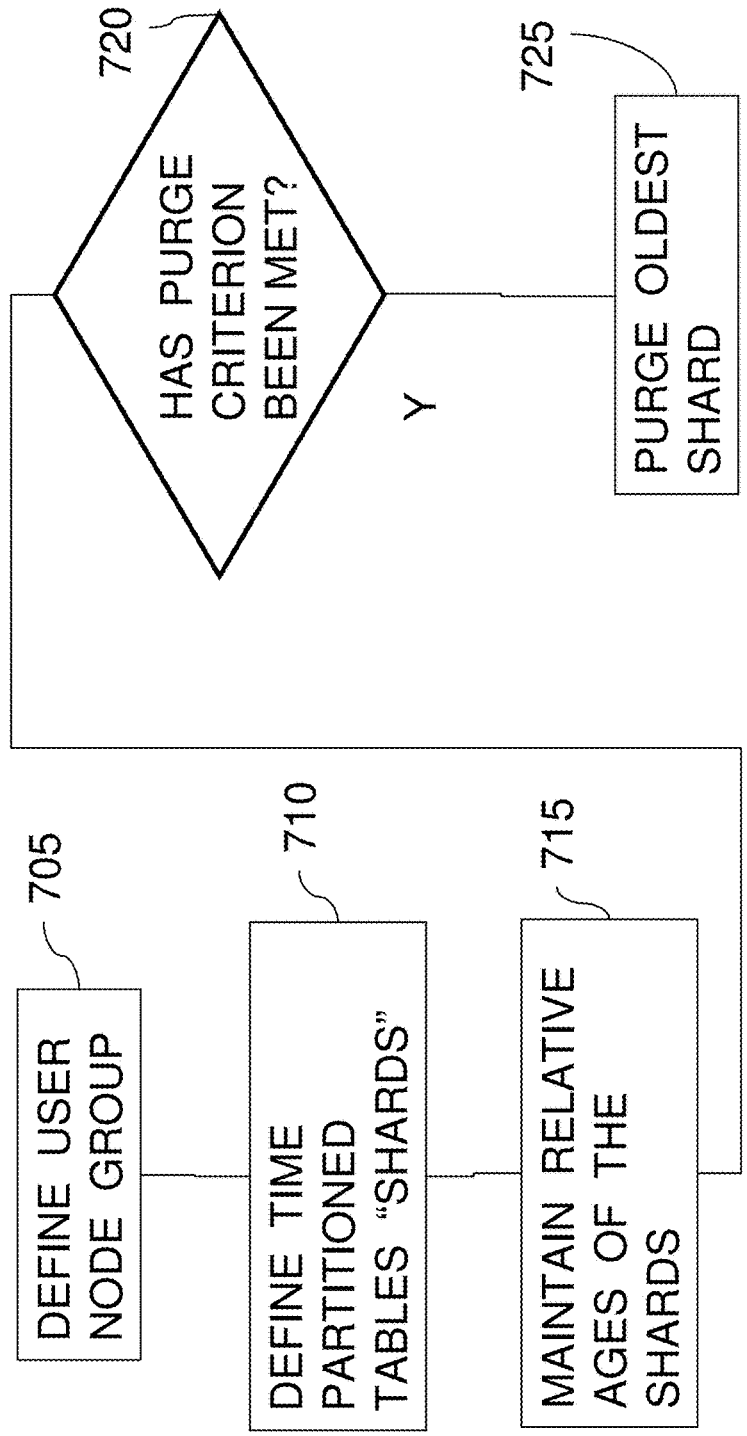
FIG. 7 is a flow chart showing operation of an embodiment.

FIG. 7 is a flowchart showing operation of an embodiment of the present subject matter.

The embodiment may represent the operational capability of a computer-based database system, of may be a method for operation such a database system. Further, a computer program product, such as a pre-recorded non-transitory medium bearing software for execution by a computer system, may direct the computer to perform such functionality.

In connection with setting up a user/customer database, the system defines a user group (705) of one or more of the database system's nodes, for storage of the user's data. The user database is defined in terms of data storage on each of the nodes of the user group, and further based on time partitioned tables (710). The data segments, residing on various data nodes and pertaining to various partitioned periods of time, are designated as "shards."

The age of the data records entered within any one of the shards is maintained (715). This may be done as a running part of the process of entering each new data record. While the data records themselves need not necessarily contain information that can serve as a date/time stamp, the database system maintains that date/time information.

As scheduled, for instance at regular intervals or responsive to events such as entry of a new data record, a purge criterion is checked (720). The purge criterion may be any suitable criterion such as whether the age of the oldest stored data has reached an age threshold. In an embodiment, however, the threshold may be that a predetermined data capacity, within the user's database, has been achieved.

Thus, according to the purge criterion, it may be that the data is old enough, or great enough in total volume, etc., that purging is needed. Accordingly, the oldest data shard is purged from the user's database (725).

System Block Diagram

Figure 8:
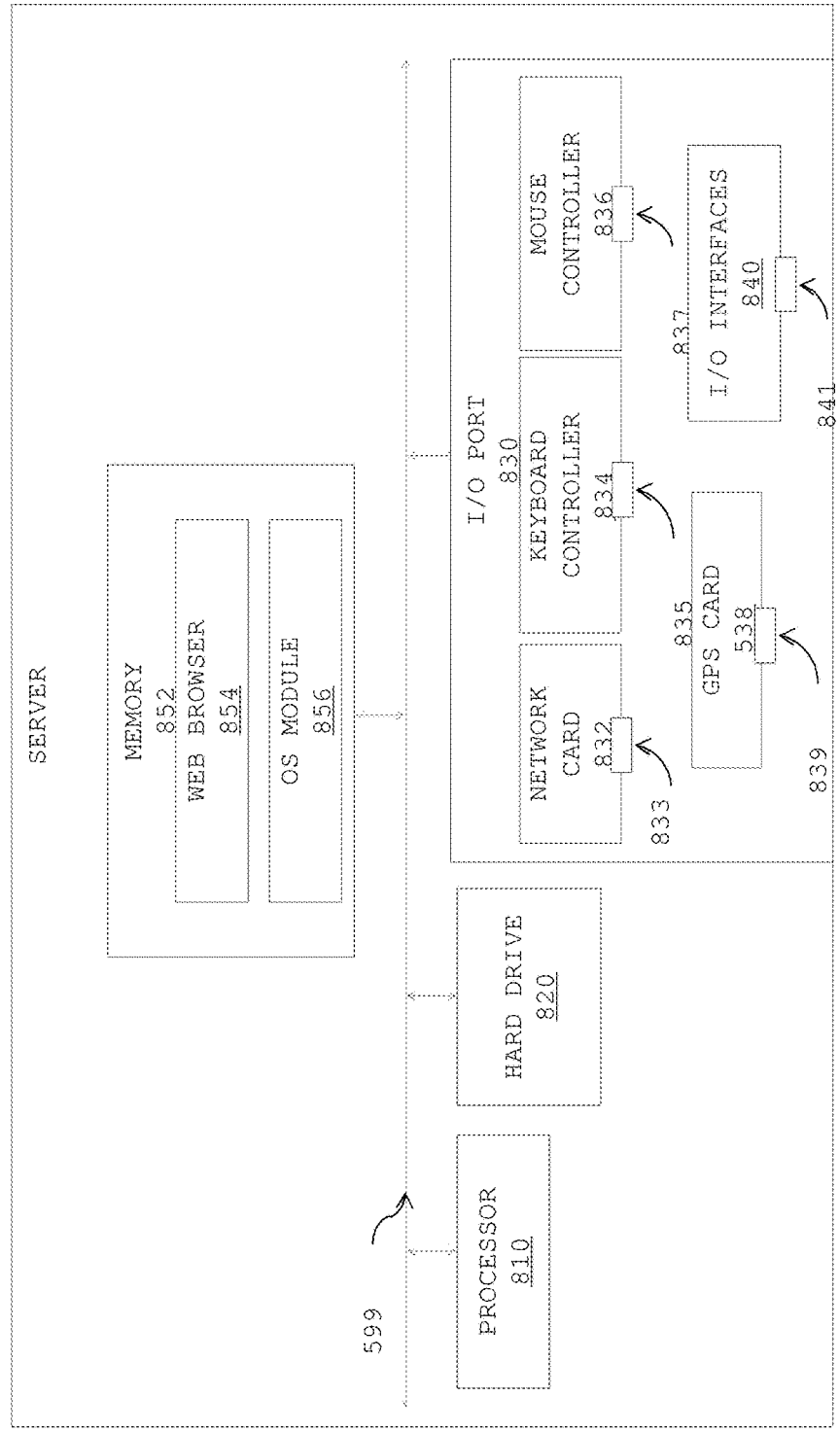
FIG. 8 is a system block diagram of a computer-based database system in accordance with an embodiment.

Additional embodiments of the database system server are described in detail in conjunction with FIG. 8.

FIG. 8 is a block diagram illustrating an exemplary computing device, for example the server 105 in accordance with one embodiment. The computing device 810 includes a processor 810, a hard drive 820, an I/O port 830, and a memory 852, coupled by a bus 899.

The bus 899 can be soldered to one or more motherboards. Examples of the processor 810 includes, but is not limited to, a general purpose processor, an application-specific integrated circuit (ASIC), an FPGA (Field Programmable Gate Array), a RISC (Reduced Instruction Set Controller) processor, or an integrated circuit. The processor 510 can be a single core or a multiple core processor. In one embodiment, the processor 810 is specially suited for processing demands of location-aware reminders (for example, custom micro-code, and instruction fetching, pipelining or cache sizes). The processor 810 can be disposed on silicon or any other suitable material. In operation, the processor 810 can receive and execute instructions and data stored in the memory 852 or the hard drive 820. The hard drive 820 can be a platter-based storage device, a flash drive, an external drive, a persistent memory device, or other types of memory.

The hard drive 820 provides persistent (long term) storage for instructions and data. The I/O port 830 is an input/output panel including a network card 832 with an interface 833 along with a keyboard controller 834, a mouse controller 836, a GPS card 838 and I/O interfaces 840. The network card 832 can be, for example, a wired networking card (for example, a USB card, or an IEEE 802.3 card), a wireless networking card (for example, an IEEE 802.11 card, or a Bluetooth card), and a cellular networking card (for example, a 3G card). The interface 833 is configured according to networking compatibility. For example, a wired networking card includes a physical port to plug in a cord, and a wireless networking card includes an antennae. The network card 532 provides access to a communication channel on a network. The keyboard controller 834 can be coupled to a physical port 535 (for example PS/2 or USB port) for connecting a keyboard. The keyboard can be a standard alphanumeric keyboard with 101 or 104 keys (including, but not limited to, alphabetic, numerical and punctuation keys, a space bar, modifier keys), a laptop or notebook keyboard, a thumb-sized keyboard, a virtual keyboard, or the like. The mouse controller 836 can also be coupled to a physical port 837 (for example, mouse or USB port). The GPS card 838 provides communication to GPS satellites operating in space to receive location data. An antenna 839 provides radio communications (or alternatively, a data port can receive location information from a peripheral device). The I/O interfaces 840 are web interfaces and are coupled to a physical port 841.

The memory 852 can be a RAM (Random Access Memory), a flash memory, a non-persistent memory device, or other devices capable of storing program instructions being executed. The memory 852 comprises an Operating System (OS) module 856 along with a web browser 854. In other embodiments, the memory 852 comprises a calendar application that manages a plurality of appointments. The OS module 856 can be one of Microsoft Windows®family of operating systems (for example, Windows 95, 98, Me, Windows NT, Windows 2000, Windows XP, Windows XP x64 Edition, Windows Vista, Windows CE, Windows Mobile), Linux, HP-UX, UNIX, Sun OS, Solaris, Mac OS X, Alpha OS, AIX, IRIX32, or IRIX64.

The web browser 854 can be a desktop web browser (for example, Internet Explorer, Mozilla, or Chrome), a mobile browser, or a web viewer built integrated into an application program. In an embodiment, a user accesses a system on the World Wide Web (WWW) through a network such as the Internet. The web browser 854 is used to download the web pages or other content in various formats including HTML, XML, text, PDF, postscript, python and PHP and may be used to upload information to other parts of the system. The web browser may use URLs (Uniform Resource Locators) to identify resources on the web and HTTP (Hypertext Transfer Protocol) in transferring files to the web.

As described herein, computer software products can be written in any of various suitable programming languages, such as C, C++, C#, Pascal, Fortran, Perl, Matlab (from MathWorks), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans (from Sun Microsystems) or Enterprise Java Beans (EJB from Sun Microsystems). Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standards 802.11, 802.11a, 802.11b, 802.11e, 802.11g, 802.11i, and 1802.11n). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products.

Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented database system comprising:
   a plurality of nodes, each node including a data storage device having memory and a server, each node of the plurality of nodes being listed in a naming registry service for distributed configuration and synchronization of distributed systems;
   a database system controller coupled to each of the plurality of nodes and having a processor and software program code for directing the database system to perform the functions of:
   defining, for a user, a node group including at least one of the plurality of nodes, upon which the user's data is to be stored in a user database,
   wherein the user database is defined in terms of time-partitioned tables residing on the nodes of the node group,
   wherein each time-partitioned table is further defined in terms of shards of the user's data, the shards corresponding with respective ones of the time partitions, and wherein user data is managed in terms of the shards on respective nodes of the node group, and
   wherein the time-partitioned tables include a chronologically oldest time-partitioned table and a current time-partitioned table, into which a new user data entry will be written;
   determining whether a predetermined criterion has been met;
   responsive to the detecting that the predetermined criterion has been met, purging all shards of the chronologically oldest time-partitioned table,
   adding an additional node to the plurality of nodes responsive to (i) receipt of additional data to store and further responsive to (ii) detection that additional storage is needed;
   registering the additional node with the naming registry service for distributed configuration and synchronization of distributed systems; and
   treating the additional node as part of a time partition commencing as of the time the additional node is added to the plurality of nodes and registered with the naming registry service for distributed configuration and synchronization of distributed systems,
   wherein the received additional data is stored in the additional node without remapping data that is already in the plurality of nodes of the node group.

2. A computer-implemented database system as recited in claim 1, wherein the naming registry service for distributed configuration and synchronization of distributed systems is the Zookeeper software project of the Apache Software Foundation.

3. A computer-implemented database system as recited in claim 1, wherein processing a database query against a database supported by the system includes:
   selecting, by start time and end time, time partitions needed to answer the query;
   obtaining base information from the selected time partitions;
   aggregating the obtained base information; and
   returning the aggregated base information as the answer to the query.

4. A computer-implemented database system as recited in claim 1, further comprising:
   maintaining a maximum user data capacity, defined in terms of memory allocated to the user and partitioned into the shards;
   wherein the determining whether a predetermined criterion has been met comprises detecting when the current shard is full.

5. A computer-implemented database system as recited in claim 1, further comprising:
wherein the determining whether a predetermined criterion has been met comprises detecting when the chronologically oldest shard has reached a predetermined age threshold.

6. A computer-implemented database system as recited in claim 1, further comprising processing a query by aggregating obtained data entries and returning the aggregated data entries as the result.

7. A computer-implemented database system as recited in claim 1, further comprising classifying the user into one of a plurality of customer classes.

8. A computer-implemented database system as recited in claim 7, wherein the customer classes are defined in terms of complexity of queries that will be used to access the customer's data.

9. A method for operating a computer-implemented database system comprising:
defining, for a user, a node group including at least one of a plurality of nodes, upon which the user's data is to be stored in a user database,
wherein the user database is defined in terms of time-partitioned tables residing on the nodes of the node group,
wherein each time-partitioned table is further defined in terms of shards of the user's data, the shards corresponding with respective ones of the time partitions, and wherein user data is managed in terms of the shards on respective nodes of the node group, and
wherein the time-partitioned tables include a chronologically oldest time-partitioned table and a current time-partitioned table, into which a new user data entry will be written;
determining whether a predetermined criterion has been met;
responsive to the detecting that the predetermined criterion has been met, purging all shards of the chronologically oldest time-partitioned table;
adding an additional node to the plurality of nodes responsive to (i) receipt of additional data to store and further responsive to (ii) detection that additional storage is needed;
registering the additional node with a naming registry service for distributed configuration and synchronization of distributed systems; and
treating the additional node as part of a time partition commencing as of the time the additional node is added to the plurality of nodes and registered with the naming registry service for distributed configuration and synchronization of distributed systems,
wherein the received additional data is stored in the additional node without remapping data that is already in the plurality of nodes of the node group.

10. A method as recited in claim 9, wherein the naming registry service for distributed configuration and synchronization of distributed systems is the Zookeeper software project of the Apache Software Foundation.

11. A method as recited in claim 9, wherein processing a database query against a database supported by the system includes:
selecting, by start time and end time, time partitions needed to answer the query;
obtaining base information from the selected time partitions;
aggregating the obtained base information; and
returning the aggregated base information as the answer to the query.

12. A method as recited in claim 9, further comprising:
maintaining a maximum user data capacity, defined in terms of memory allocated to the user and partitioned into the shards;
wherein the determining whether a predetermined criterion has been met comprises detecting when the current shard is full.

13. A method as recited in claim 9, further comprising:
wherein the determining whether a predetermined criterion has been met comprises detecting when the chronologically oldest shard has reached a predetermined age threshold.

14. A method as recited in claim 9, further comprising processing a query by aggregating obtained data entries and returning the aggregated data entries as the result.

15. A method as recited in claim 9, further comprising classifying the user into one of a plurality of customer classes.

16. A method as recited in claim 15, wherein the customer classes are defined in terms of complexity of queries that will be used to access the customer's data.

17. A computer program product for directing a computer system to operate a database system, the computer program product comprising:
a non-transitory computer-readable medium; and
computer program software code, provided on the non-transitory computer-readable medium, for directing a computer-implemented database system to perform the actions of:
defining, for a user, a node group including at least one of a plurality of nodes, upon which the user's data is to be stored in a user database,
wherein the user database is defined in terms of time-partitioned tables residing on the nodes of the node group,
wherein each time-partitioned table is defined in terms of shards of the user's data, the shards corresponding with respective ones of the time partitions, and wherein user data is managed in terms of the shards on respective nodes of the node group, and
wherein the time-partitioned table s include a chronologically oldest time-partitioned table and a current time-partitioned table into which a new user data entry will be written;
determining whether a predetermined criterion has been met; and
responsive to the detecting that the predetermined criterion has been met, purging the chronologically oldest time-partitioned table;
adding an additional node to the plurality of nodes responsive to (i) receipt of additional data to store and further responsive to (ii) detection that additional storage is needed;
registering the additional node with a naming registry service for distributed configuration and synchronization of distributed systems; and
treating the additional node as part of a time partition commencing as of the time the additional node is added to the plurality of nodes and registered with the naming registry service for distributed configuration and synchronization of distributed systems,
wherein the received additional data is stored in the additional node without remapping data that is already in the plurality of nodes of the node group.

18. A computer program product as recited in claim 17, wherein the naming registry service for distributed configuration and synchronization of distributed systems is the Zookeeper software project of the Apache Software Foundation.

19. A computer program product as recited in claim 17, wherein processing a database query against a database supported by the system includes:
   selecting, by start time and end time, time partitions needed to answer the query;
   obtaining base information from the selected time partitions;
   aggregating the obtained base information; and
   returning the aggregated base information as the answer to the query.

20. A computer program product as recited in claim 17, further comprising:
   maintaining a maximum user data capacity, defined in terms of memory allocated to the user and partitioned into the shards;
   wherein the determining whether a predetermined criterion has been met comprises detecting when the current shard is full.

21. A computer program product as recited in claim 17, further comprising:
   wherein the determining whether a predetermined criterion has been met comprises detecting when the chronologically oldest shard has reached a predetermined age threshold.

22. A computer program product as recited in claim 17, further comprising processing a query by aggregating obtained data entries and returning the aggregated data entries as the result.

23. A computer program product as recited in claim 17, further comprising classifying the user into one of a plurality of customer classes.

24. A computer program product as recited in claim 23, wherein the customer classes are defined in terms of complexity of queries that will be used to access the customer's data.

25. A computer-implemented method, comprising:
   adding records to a database at different times;
   grouping the records into partitions based on when the records were added to the database, where each partition corresponds to a respective time range that respective records in the partition were added to the database;
   obtaining a query that indicates a time range that one or more records were added to the database;
   identifying a particular partition of the partitions based at least on the indication in the query of the time range that the one or more records were added to the database; and
   obtaining information from the one or more records from the particular partition that is identified.

* * * * *